Nov. 8, 1938.   W. A. RINGLER   2,135,533
DISPLAY CARTON
Filed April 22, 1936   5 Sheets-Sheet 2
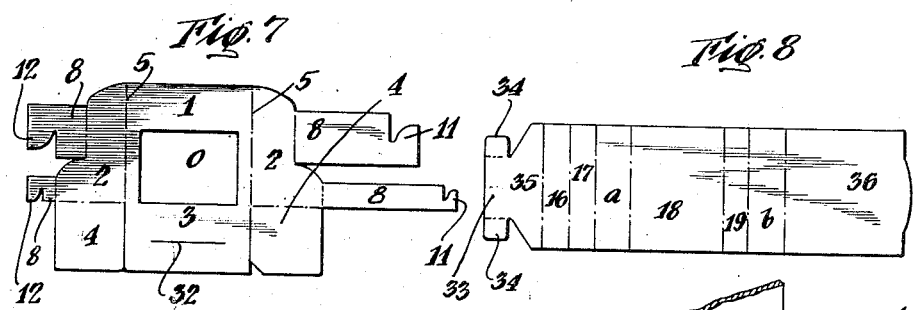
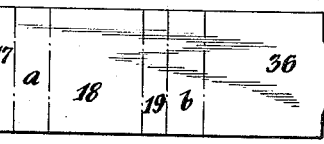
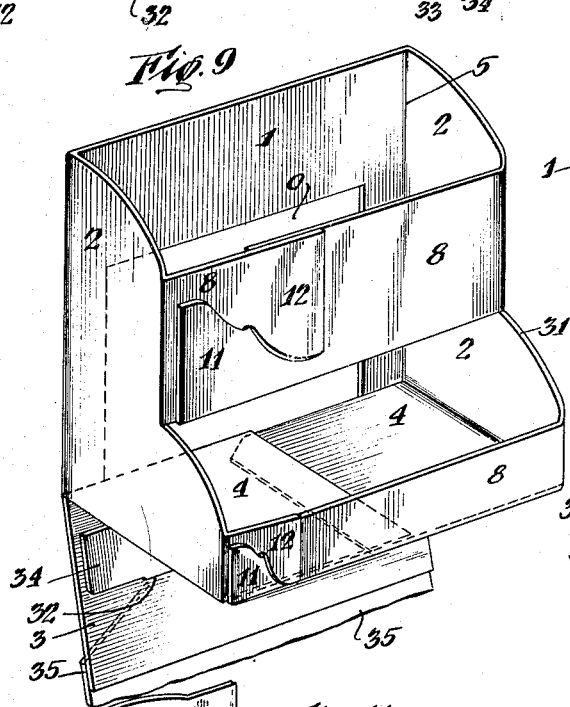
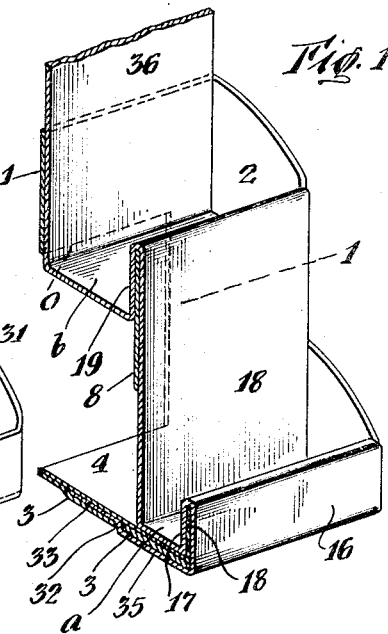
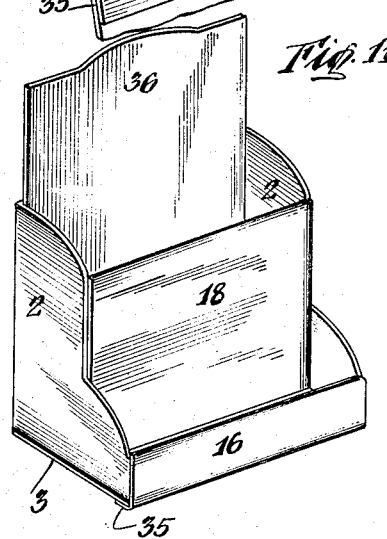
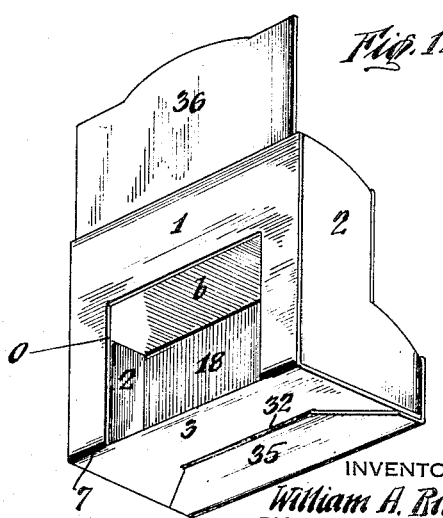
INVENTOR
*William A. Ringler*
BY
*Albert M. Austin*
ATTORNEY

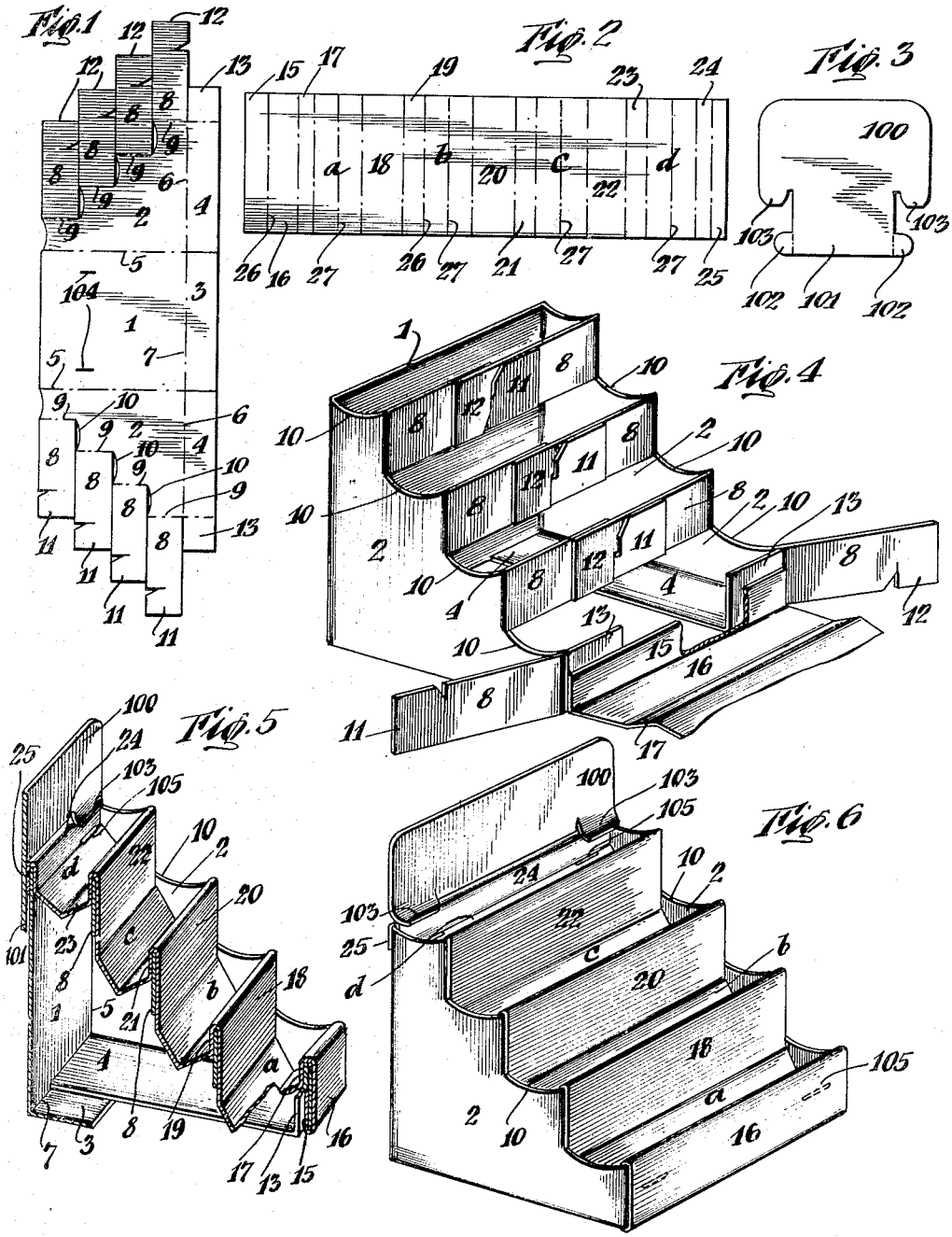

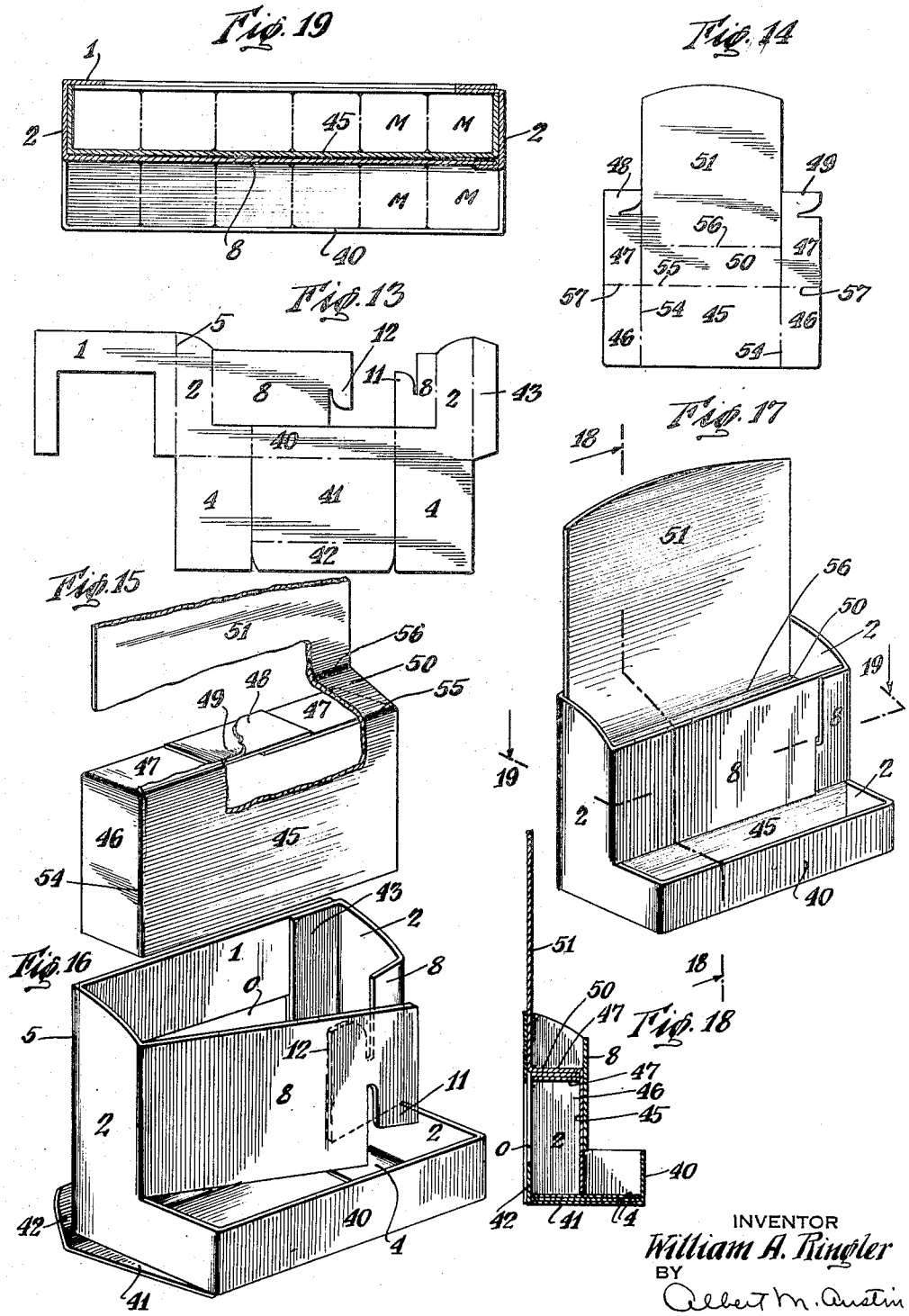

Nov. 8, 1938.  W. A. RINGLER  2,135,533
DISPLAY CARTON
Filed April 22, 1936  5 Sheets-Sheet 4
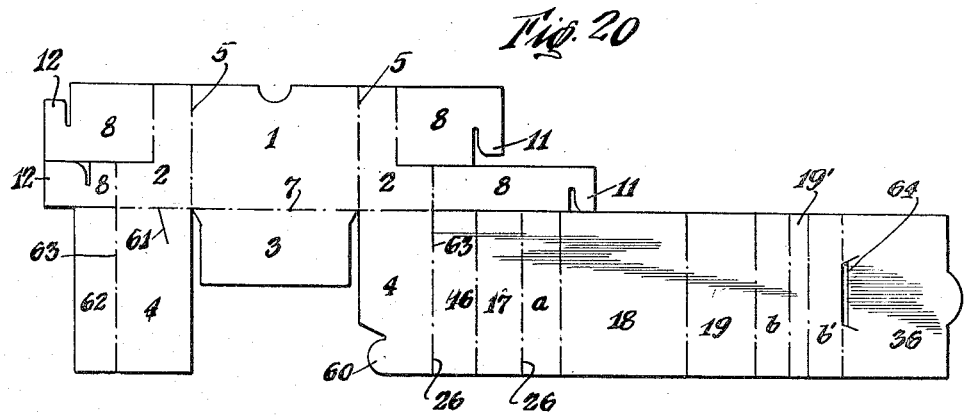
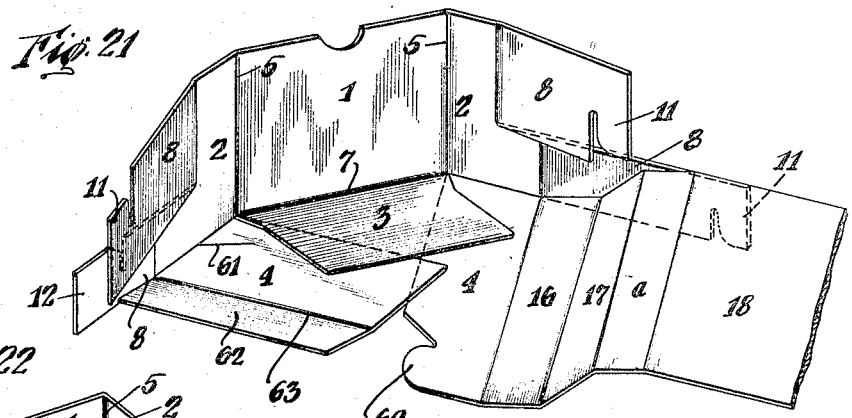
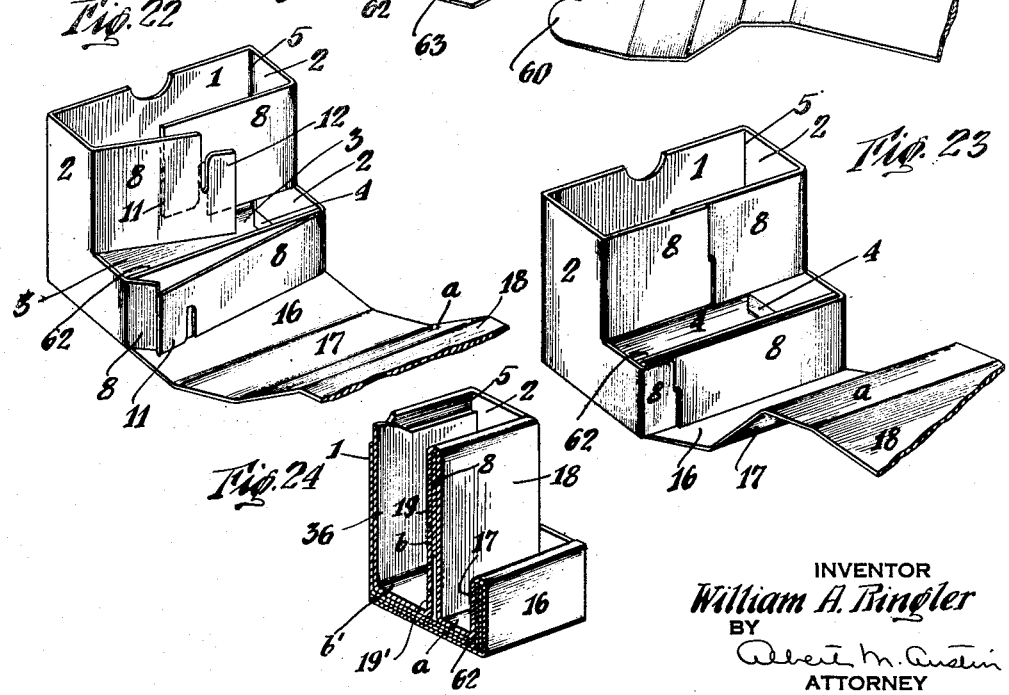
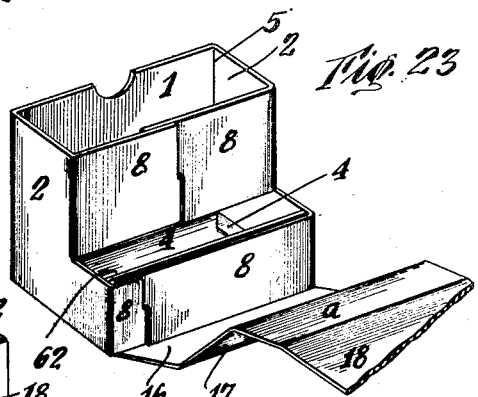
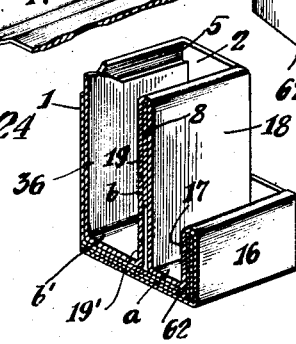
INVENTOR
William A. Ringler
BY
Albert M. Austin
ATTORNEY Nov. 8, 1938.   W. A. RINGLER   2,135,533
DISPLAY CARTON
Filed April 22, 1936   5 Sheets-Sheet 5
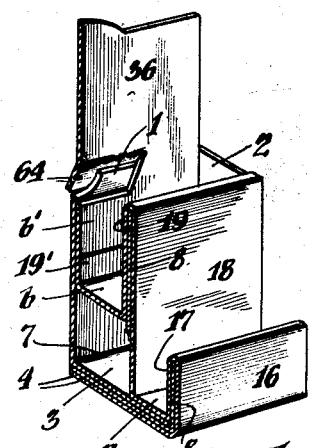
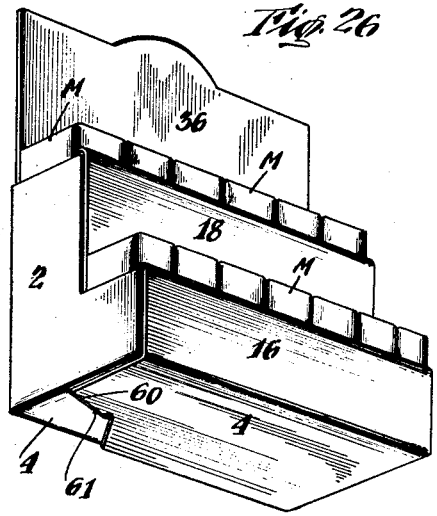
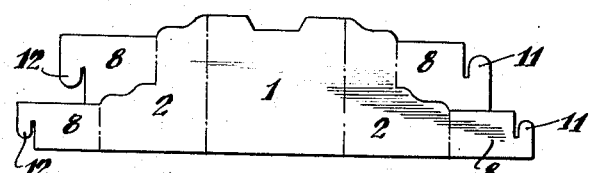
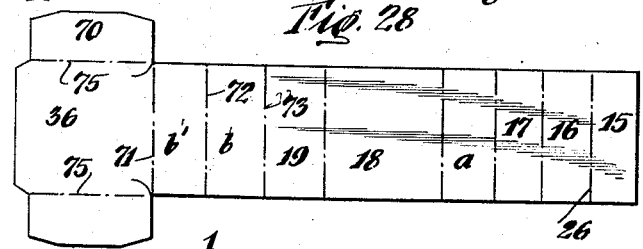
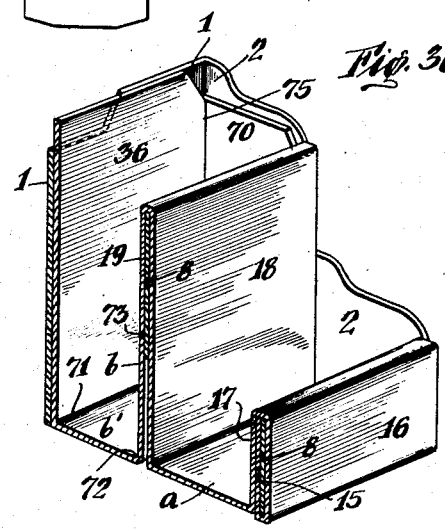
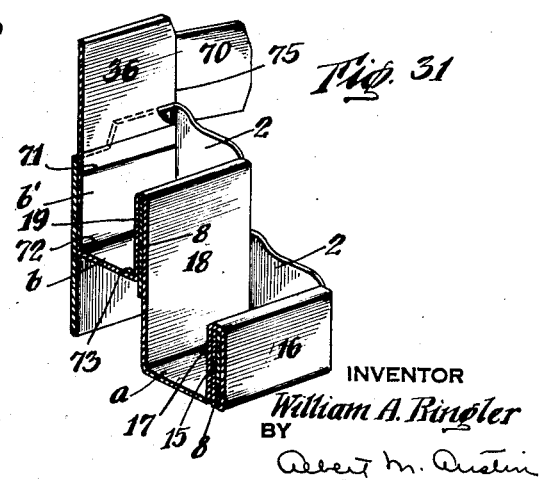
INVENTOR
William A. Ringler
BY
Albert M. Austin
ATTORNEY Patented Nov. 8, 1938

2,135,533

UNITED STATES PATENT OFFICE 2,135,533

DISPLAY CARTON

William A. Ringler, Wayne, Pa., assignor to National Folding Box Company, New Haven, Conn., a corporation of New Jersey Application April 22, 1936, Serial No. 75,691

10 Claims. (Cl. 206—45)

This invention relates to display cartons and more particularly to a display carton in which the articles of merchandise may be arranged in elevated rows for attractive display.

It is often desirable to arrange merchandise articles in stepped or elevated rows so that they will be readily visible to the purchaser. This invention is concerned with the provision of a carton which is economical to manufacture and which can be quickly set up to provide an attractive container which will rigidly support the merchandise articles arranged in elevated rows. The container is preferably made of paperboard material but can, of course, be made of other sheet material which can be bent or shaped into the desired form.

In general my improved step-up display carton comprises a body portion having a rear wall section and end wall sections, the end wall sections being connected together by suitable risers which may be in the form of interconnected tabs extending from the end sections. An article-supporting strip which may be formed as a separate blank or integral with the body-forming blank, is then draped over the risers so as to provide a plurality of spaced merchandise-receiving pockets arranged at different elevations. Each pocket is adapted to receive a single merchandise article or a row of articles. This invention further comprehends the provision of a merchandise-supporting strip which is so shaped as to fully contain and protect the merchandise when the carton is used as a shipping container, and which strip can be easily adjusted into display position by the merchant so as to support the merchandise in attractive elevated rows for display purposes.

The invention further comprehends the provision of a chamber within the carton within which the merchandise articles may be stored out of the normal view of customers in the store. The articles sold or otherwise removed from their display position can be replenished from the supply of articles contained within the chamber. A novel and attractive display card may also be associated with, or form an integral part of, the carton.

Other objects and advantages of this invention will become apparent to those skilled in the art as this disclosure proceeds.

In order that a clear understanding of this invention may be had, attention is directed to the accompanying drawings forming a part of this application, the said drawings intending to illustrate by way of example only a few of the many uses to which this invention and the principles involved therein may be put.

Fig. 1 is a face view of a blank which has been suitably cut and scored to form the body portion of the carton;

Fig. 2 is a face view of a blank strip suitably cut and scored so that when assembled with the body-forming blank shown in Fig. 1 a series of merchandise containing pockets arranged in tier formation will be provided;

Fig. 3 is a face view of a blank which may be associated with the body-forming blank shown in Fig. 1 to provide a display card for the carton;

Fig. 4 is a perspective view of the body portion as it appears when assembled from the blank shown in Fig. 1, a fragment of the pocket-forming strip shown in Fig. 2 being shown about to be applied to the body portion;

Fig. 5 is a perspective view of the display carton as it appears when fully assembled, parts being broken away to more clearly illustrate the construction;

Fig. 6 is a perspective view of the completely assembled display carton ready to receive the merchandise for display;

Fig. 7 is a face view of a body-forming blank of somewhat modified construction;

Fig. 8 is a face view of a modified pocket-forming strip having a display card portion associated therewith and adapted to be assembled with the body-forming blank shown in Fig. 7;

Fig. 9 is a perspective view of the body-forming blank shown in Fig. 7 as it appears partially assembled;

Fig. 10 is a perspective view of the fully assembled display carton formed from the blank shown in Figs. 7 and 8, certain parts being broken away to illustrate certain features of the construction;

Fig. 11 is a perspective view of the fully assembled display carton, particularly showing the arrangement of the merchandising-receiving pockets and the display card associated therewith;

Fig. 12 is a perspective view of a display carton shown in Fig. 11 looking at the rear thereof, this view particularly showing the chamber within the carton in which the merchandise or other articles may be stored;

Fig. 13 is a face view of a further modified form of body-forming blank from which a display carton may be assembled;

Fig. 14 is a face view of a blank from which an elevated article-supporting platform having a display card associated therewith may be formed, which platform may be associated with the body-forming blank shown in Fig. 13;

Fig. 15 is a perspective view of the article-supporting platform assembled from the blank shown in Fig. 14;

Fig. 16 is a perspective view of the body portion of the carton assembled from the blank shown in Fig. 13 ready to receive the article-supporting platform assembled from the blank shown in Fig. 14;

Fig. 17 is a perspective view of the display carton assembled from the blanks shown in Figs. 13 and 14;

Fig. 18 is a vertical cross-sectional view of the display carton shown in Fig. 17, this view being taken on line 18—18 of Fig. 17;

Fig. 19 is a horizontal cross-sectional view through the display carton shown in Fig. 17 illustrating particularly the manner in which the merchandise articles may be arranged therein, this view being taken at line 19—19 of Fig. 17;

Fig. 20 is a face view of a blank of further modified construction and from which the complete container may be assembled;

Fig. 21 is a fragmentary perspective view of the blank shown in Fig. 20 as it appears during one stage of the assembly operation;

Fig. 22 is a perspective view of the carton as it appears at another stage of the assembly operation;

Fig. 23 illustrates the blank shown in Fig. 20 at a still further advanced stage of assembly into a display carton;

Fig. 24 is a perspective view of the display carton as it appears when completely assembled from the blank shown in Fig. 20 and adjusted to contain articles of merchandise in shipping or storage position, certain parts being broken away to illustrate certain features of the construction;

Fig. 25 is a perspective view of the display carton assembled from the blank shown in Fig. 20, the carton being adjusted for merchandise display, certain parts being broken away to illustrate certain structural features;

Fig. 26 is a perspective view of the fully assembled container as it appears with merchandise packed therein;

Fig. 27 is a face view of a blank from which the body portion of a display carton of further modified form may be made;

Fig. 28 is a face view of a blank for assembly with the blank shown in Fig. 27 to provide merchandise-receiving pockets and a display card;

Fig. 29 is a perspective view of the completely assembled blank shown in Fig. 27 providing the body portion for this display carton;

Fig. 30 is a perspective view of the body-forming blank shown in Fig. 27 and the pocket-forming blank shown in Fig. 28 in fully assembled relationship with the pocket-forming blank adjusted into shipping or storage position, certain parts being broken away to illustrate the structural features; and Fig. 31 is a perspective view of the fully assembled display carton shown in Fig. 30, the pocket-forming strip being adjusted to support the merchandise articles in display position.

Similar reference characters refer to similar parts throughout the several views of the drawings and specification.

The display carton as shown in Figs. 1 to 6, inclusive, is formed generally from a body-forming blank which supports, when assembled, a step-up article-supporting strip formed from the blank shown in Fig. 2. The body comprises generally a rear wall section 1 connecting the end wall sections along the score lines 5. The body is preferably provided with a footing or bottom portion which may comprise the flap 3 hinged to the rear wall section 1 along the score line 7, and the flaps 4 hinged to the end sections 2 along the score line 6. The end sections 2 are provided with a plurality of spaced offset riser-forming flaps 8 which are hinged to the end wall sections 2 along the spaced offset score lines 9.

In assembling the body, the end section 1 is raised into vertical position, the flaps 3 and 4 turned inwardly into horizontal position, and the end wall sections 2 arranged at right angles to the rear wall section 1, as shown in Fig. 4. The riser-forming flaps 8 are then turned inwardly and are suitably connected together so as to form a series of spaced offset riser walls or partitions. For purposes of illustration, I have shown the riser tabs 8 connected together by means of the interlocking hook portions 11 and 12 provided on the ends of the tabs 8, although it is understood that other means of connection may be provided as desired. When the body is set up, the edge of the body defined by the score lines 9 define the vertical rise or height of each step, while the horizontal edge 10 extending between and connecting the adjacent score lines 9 defines the horizontal width of the step. It is understood, however, that the riser height and the step width may be made in any dimension desired best adapted to set off and retain the articles to be displayed. The tabs 8 may be of any desired length and if desired, may overlap their full length to give added strength to the construction. It is also understood that the tabs 8 may either extend from the vertical riser edges of the end wall sections 2 or from the horizontal step edges 10 of the end section.

When the body has been assembled, as shown by way of example in Fig. 4, the article-supporting section shown in Fig. 2 is applied. The article-supporting section may comprise a simple rectangular strip of paper-board material which has been suitable scored transversely thereof, as at 26, to permit the same to be easily applied and uniformly draped over the riser tabs 8. Referring more particularly to Fig. 4, flap section 15 is positioned against the upturned tabs 13 extending from the end flaps 4 of the body. The riser flaps 8 are then swung into position over the flap 15 and interlocked together so that the flap 15 of the strip section is positioned between the tabs 13 and the riser flap 8. The front riser 16 is then raised upwardly so as to form a face for the first step riser, as shown in Fig. 6. The portion 17 is then folded inwardly against the inside face of the tabs 13 and the first step portion *a* is arranged to extend substantially horizontally to form in effect a pocket for one or more articles to be displayed. The riser portion 18 is then draped over the second pair of riser tabs 8, the inside riser portion 19 inserted, the step or article-supporting portion *b* arranged in horizontal position, the outside riser portion 20 and the inside riser portion 21 is then draped over the third pair of riser tabs 8, the article-supporting portion *c* arranged in horizontal position, and the riser portions 22 & 23 draped over the fourth pair of riser tabs 8, and finally the article-supporting portion *d* is arranged in horizontal position between the top riser tabs 8 and the rear wall section 1. Suitable means are provided for securing the upper end of the strip section to the rear wall section 1 of the body. For example, I have shown for purposes of illustration, a facing portion 24 and a flap portion 25 which are draped around and over the top edge of the rear wall section 1, as best illustrated in Fig. 5. The portions 24 and 25 may be fixed to the rear wall section 1 by any suitable means such as, staples 105, glue, or if desired, by releasable interlocking tabs. The bottom flap 15 of the strip section may also be fixedly secured to the tabs 13 by means of staples 105, glue or other means, either permanent or releasable in nature.

The transverse score lines 26 give the assembled construction a smooth and finished appearance, defining the various riser portions 16 and 17, 18 and 19, 20 and 21, 22 and 23, 24 and 25, from each other and from their horizontal step portions, $a$, $b$, $c$ and $d$. When thus assembled, as illustrated in Figs. 5 and 6, neat and attractive pockets are provided in stepped relationship which are adapted to retain and confine various articles of merchandise. Thus separate articles, such as bottles, cans, boxes, cartons, or other merchandise of varied shapes and forms may be arranged in stepped rows and supported within the pockets above described. It is understood that any number of pockets of any width, length or dimension may be provided within the contemplation of this invention which is best suited to retain and to most attractively display the merchandise. Intermediate score lines 27, extending transversely across the horizontal article-supporting portions $a$, $b$, $c$, and $d$, may be provided to give the pockets a trough-shaped cross-section to better retain certain types of merchandise.

This display carton above described can be economically made on an automatic cutting and scoring machine and can be shipped and stored in the flat blank form as shown in Figs. 1 and 2 until ready for use. The carton may be used as a shipping package by packing the goods therein in stepped relationship and assembling two packed cartons together with the stepped faces adjacently arranged. If desired, a display card, as shown in Fig. 3, may be provided which is attachable to the body of the carton. The display card may comprise a display section 100 adapted to carry the desired advertising, a support section 101 seating against the rear face of the rear wall section of the body, ears 103 extending and overlapping the top edge of the rear wall section 1 and ears 102 extending from the support section 101 into corresponding slits 104 provided in the rear wall section 1.

There is shown in Figs. 7 to 12, inclusive, a somewhat modified form of step-up display carton. The body, formed from the blank shown in Fig. 7, comprises a rear wall section 1, end wall sections 2 extending at right angles therefrom, inturned interlocking riser tabs 8 hinged to the end wall sections 2, a bottom forming flap 3 extending inwardly from the end wall sections 2. When the body is set up, as shown in Fig. 9, the hook portions 11 and 12 associated with the riser tabs 8 are arranged in interlocked relationship, the bottom flaps 4 are turned inwardly, and the bottom wall-forming flap 3 is superimposed thereover.

The article-supporting strip section, as shown in Fig. 8, is provided with a bottom portion 35 seating against the outside face of the bottom-forming flap 3. The bottom portion 35 is provided with a tab extension 33 having ears 34 laterally projecting therefrom. The tab extension 33 is insertable into a suitable slit 32 cut in the bottom-forming flap 3 when the ears 34 are bent to overlie the tab extension 33. When the tab extension 33 has been fully inserted into the slit 32, the ears 34 then open outwardly so as to form a permanent locking connection between the bottom-forming flap 3 and the article-supporting strip section. The interlocking connection between these parts is clearly shown in Figs. 9 and 10 of the drawings.

When the body and article-supporting section have been thus connected, the riser portions 16 and 17 are draped over the first pair of riser tabs 8, as clearly shown in Fig. 10. The bottom portion $a$ may be arranged to seat against the inside face of the flap 4, forming a smooth and rigid bottom. The riser portions 18 and 19 are then draped over the second pair of riser tabs 8, and the bottom-forming portion $b$ arranged in horizontal article-supporting position. An upstanding portion 36 extending from the bottom portion $b$ may be provided to form an attractive display card for the carton. Suitable means such as hooks, staples, glue, clips or tab and slot connections may be provided for permanently or releasably connecting the upstanding portion 36 to either the rear wall section 1 or the end wall sections 2 to support the display card portion 36 in fixed position. Where the display portion 36 is releasably connected to the end wall section 1 or the side wall sections 2 of the body, the carton can be shipped in flat knockdown condition and set up by the user at the point where the goods are packed. The carton may also be used as a shipping container by assembling two packed cartons together with the step faces in adjacent relationship.

Merchandise may also be stored and packed within the carton by providing a cut-out opening $o$ in the rear wall section 1 through which goods may be inserted into the interior space defined by the bottom portion $b$, riser tabs 8 and the end wall section 2, as clearly shown in Fig. 12. Merchandise may be packed within this space either during shipment or when the carton is set up for display. Sometimes it may be convenient and desirable to house within the carton an extra supply of the articles displayed. Thus the articles can be conveniently withdrawn as desired to refill the step display. Or again, during a certain period, such as at night, it may be desirable to remove the goods from their step display arrangement and place them within the carton where they are concealed from view and better protected against dust, contamination and deterioration. The carton may be made in any form or shape desired, and the pockets so constructed and arranged as to best support and display the particular article of merchandise contained therein.

There is shown in Figs. 13 to 19 inclusive, a further modified form of step-up display carton. In this form, the body section is formed from the blank shown in Fig. 13 and comprises a rear wall section 1, a front wall section 40, end wall sections 2 hinged to the front wall section 40 and a securing tab 43 extending from one of the end wall sections and adapted to be adhesively or otherwise secured to the free vertical edge of the rear wall section 1. One or more pairs of riser tabs 8 extending inwardly from the end wall sections 2 may be connected together in interlocked relationship by means of the locking hooks 11 and 12 associated therewith.

In assembling the body, the securing tab 43 is first secured to the free vertical edge of the rear wall section 1, end flaps 4 extending from the end wall sections 2 are turned inwardly and a bottom-forming flap extending from the front wall section 40 is then folded over the inturned end flaps 4. The bottom-forming flap 41 may be provided with an insert flap 42, insertable into the carton so as to lie against the inside face of the rear wall section 1. The riser tabs 8 are then connected and the body is assembled, as shown in Figs. 16 and 17.

In this modification, I provide a step support for each row of merchandise. A supporting platform is assembled from the blank shown in Fig. 14. The supporting platform comprises a horizontal top supporting wall 50, a front wall 45 hinged to the top wall along the score line 55, end walls 46 hinged to the front wall 45 along the score line 54, and top flaps 47 extending from the end walls 46 which may be interlocked together by means of the hook portions 48 and 49 associated therewith, the top flaps 47 thus providing a supporting structure for the top wall 50, as clearly shown in Fig. 15. The supporting platform is made of the proper dimensions and size to telescope into the selected chamber of the body portion, which chambers are defined by the riser tabs 8. Where a two-row display only is provided, as shown in Fig. 17, one row of merchandise may be positioned to rest on the bottom-forming flap 41 and the second row of merchandise articles may rest upon the supporting platform above-described positioned between the riser tabs 8 and the rear wall section 1. It is understood that a display carton of any desired number of rows may be provided and a suitable supporting platform or platforms of any desired height provided to support the merchandise in attractive step-up display arrangement. The platform positioned within the rearmost chamber may be provided with an upwardly extending display card 51 which seats against the inside face of the rear wall section 1 and is connected to the top wall 50 of the supporting platform along the score line 56. One form of this type of step display when completely assembled appears as shown in Fig. 17. The merchandise articles M, as shown in Fig. 19 can thus be attractively displayed.

There is shown in Figs. 20 to 26, inclusive, a further modified form of step-up display which may be formed from a single blank of paperboard material, as shown in Fig. 20. This construction comprises a rear wall section 1, end wall sections 2 hinged thereto, and bottom-forming flaps 4 hinged to the end wall sections 2 arranged to extend in overlapped relationship and interlocked together by means of the cooperating tab or ear 60 and the slit 61 associated therewith. A bottom flap 3 hinged to the rear wall section 1 extends inwardly and is supported upon the interlocked bottom-forming flaps 4. Riser tabs 8 extend inwardly from the end wall sections 2 and are suitably interconnected together as by cooperating locking hooks 11 and 12. One of the bottom-forming flaps 4 is provided with a reinforcing flap 62 hinged thereto along the score lines 63, which reinforcing flap is adapted to be arranged in a vertical position and to extend between the end wall sections 2, as shown in Fig. 22. The interconnected riser tabs 8 which form the first step riser are preferably arranged against the outside face of the reinforcing flap 62. The article-supporting strip section is joined to the other bottom-forming flap 4 along the score line 26 and comprises riser portions 16 and 17 adapted to be draped over the first pair of interconnected riser tabs 8, as clearly shown in Figs. 23 and 24. The bottom portion $a$ of the strip section is then arranged in horizontal position, and, if desired, may rest against the inturned bottom flap 3. Riser portions 18 and 19 are then draped over the second pair of interlocked riser tabs 8 so as to form a second article-receiving pocket.

An important feature of this construction is the provision of an adjustable article-supporting platform which may be either adjusted to substantially seat against the bottom wall of the carton when the goods are to be shipped or stored (see Fig. 24) and which may be raised upwardly and adjusted to support the merchandise in step-up display arrangement, as shown in Fig. 25. This novel adjustable arrangement is accomplished by providing two bottom portions $b$ and $b'$ in the strip section of substantially the same dimensions separated by a connecting wall 19'. When the carton is arranged in shipping position, the bottom portion $b'$ seats against the inturned bottom flap 3, and the riser portion 19, the bottom portion $b$ and the connecting portion 19' all seat against the inside face of the second pair of riser flaps 8 so that the portions 19, $b$ and 19' all form a vertical lining for the rear pocket. A flap extension 36 is hinged to and extends from the bottom portion $b'$ and when in shipping position, seats against the inside face of the rear wall section 1.

When the carton is to be arranged in display position, the flap extension 36 is grasped and pulled upwardly and the cut-out ear 64 is adjusted to straddle and engage the upper edge of the rear wall section 1. When thus arranged, the flap extension 36 forms a display card and the bottom portion $b$ is supported in horizontal position, as shown in Fig. 25. The bottom portion $b'$ and the connecting portion 19" then seat against the inside face of the rear wall section 1 and provides a vertical lining wall for the rear pocket. Fig. 26 shows this carton set up into display position with merchandise articles M attractively arranged in elevated rows or tiers. This construction can be inexpensively manufactured by cutting out and scoring the blanks on a cutting and scoring machine, the blanks can be economically shipped and stored in flat condition, the blanks thereafter can be quickly assembled without the use of glue or other securing means at the place of use, the goods can then be quickly packed therein and the carton used as a shipping container, and when the container reaches the merchant, the same may be set up on the counter and the various articles of merchandise packed therein may be quickly placed into an attractive elevated display arrangement by simply pulling upwardly on the extension 36 and straddling the tab 64 over the top edge of the rear section 1.

There is shown in Figs. 27 to 31 inclusive, a step-up display carton of further modified form. The body of this carton is formed from the blank shown in Fig. 27 comprising a rear wall section 1, end wall sections 2 hinged thereto, and riser-forming tabs extending inwardly from the end wall section. When the hook portions 11 and 12 of the respective riser tabs are interconnected, a carton body, such as shown in Fig. 29, is formed.

The merchandise-supporting section is formed from the blank shown in Fig. 28 which is suitably scored, as at 26, to define riser portions and bottom portions for the pockets. The flap 15 is positioned against the inside face of the first pair of riser tabs 8 and the riser portion 16 is then folded along the score line 26 around the lower edge of and against the outside face of the first pair of riser tabs 8, as more fully shown in Figs. 30 and 31. The riser portion 17 is then draped around the top edge of the first pair of riser tabs 8 and the bottom portion $a$ is arranged in substantially horizontal position. The riser portions 18 and 19 are then draped around the second pair of riser tabs 8. In this construction two bottom portions are provided, one bottom portion $b'$ being arranged to support the merchandise in shipping position and substantially at the same level as the merchandise supported upon the bottom portion $a$. When the carton is to be arranged in display position the display card extension 36 connected to the bottom portion $b'$ along the score lines 71 is pulled upwardly, thereby raising the bottom portion $b$ hinged to the riser portion 19 along the score lines 73 and to the bottom portion $b'$ along the score lines 72, into horizontal article-supporting position. When thus arranged, the carton will appear as shown in Fig. 31. To support the display card 36 and the bottom-forming strip section associated therewith in raised display position, wings 70 hinged to the display card portion 36 along the score lines 75 is provided. In display position, the wing portions 70 are swung outwardly so as to rest upon the top edge of the end wall sections 2, thus firmly supporting the display card 36 and the bottom portions $a$ and $b$ in stepped display arrangement. When the carton is arranged in shipping position, the wing portions 70 fold into the carton and seat against the inside face of the end wall sections 2, as shown in Fig. 30. Preferably, the wing portions 70 are of sufficient width to extend between the rear wall section 1 and the adjacent riser to thus brace and reinforce the construction. The wing portions 70 are adapted to carry advertising on the front face thereof in harmony with the advertising on the display card 36, thus further enhancing the display carton by providing an attractive advertising media in association therewith. When the carton is arranged in shipping position as shown in Fig. 30, a suitable cover may be telescoped thereover if desired, or, if desired, two such display cartons as shown in Fig. 30 may be grouped together with their step faces adjacently arranged, thus providing a substantially cubical package.

It is now seen that a step-up display carton in various forms has been provided which can be very economically produced by automatic machinery with a minimum of labor. The body sections, as well as the bottom-forming strip section, may be formed as two separate blanks or may be combined into one blank, which blanks are simultaneously cut from large sheets or rolls of paper and scored to the proper size, shape and dimension by means of an automatic cutting and scoring machine. The blanks are adapted to be shipped and stored in flat extended condition, thus occupying a minimum of space. Where a display carton is to be formed, the assembly operation can be quickly executed by unskilled labor. If desired, the fully assembled carton may be maintained in rigid assembly by the use of interconnecting tabs or hooks and slits, thus requiring no extraneous securing means such as glue, staples, or clips. The body section and bottom-forming section when assembled mutually contribute to stiffen, strengthen and reinforce the assembled carton. The article-supporting section may also be made adjustable to support the merchandise in shipping position and in display position by making certain simple adjustments. The merchandise may be housed within the carton either to protect or conceal the merchandise or to provide a convenient supply from which the step display may be quickly refilled when articles are withdrawn from their pocketed display position and sold. The merchandise-containing pockets may be so formed and shaped as to frictionally retain the articles of merchandise therein and to firmly support the merchandise in erect attractively arranged display position. If desired, the pockets may be filled with dummy packages, the genuine article being housed within the display carton. Thus the merchant suffers no serious loss if one or more of the dummy packages are stolen, which will probably not occur when the would-be thief notices that they are dummy packages void of valuable contents.

My display carton is admirably adapted for the shipment, storage and display of numerous articles of merchandise as will be evident to those skilled in the merchandising art. Cartons, packages, boxes, cans, containers, bottles, each containing a merchandise unit or the merchandise itself with or without wrapping may be attractively arranged in elevated rows in the cartons herein described.

While certain novel features of the invention have been disclosed and are pointed out in the annexed claims, it will be understood that various omissions, substitutions and changes may be made by those skilled in the art without departing from the spirit of the invention.

What is claimed is:

1. A shipping and display carton comprising a body formed of paper board material, including end wall sections, a rear wall section connecting said end wall sections, a series of tabs extending from said end wall sections and arranged in spaced elevated relationship, said tabs extending inwardly in overlapping relationship to provide a series of vertical step up wall portions extending across the front of the carton at different elevations, a strip section having a portion thereof draped over said step up wall portions providing a series of article-supporting tiers arranged at different elevations, and means for attaching the strip section to the rear wall of the carton whereby said strip section is supported in tier arrangement.

2. A shipping and display carton comprising a body formed of paper board material, including end wall sections, a rear wall section connecting said end wall sections, a series of tabs formed integrally with said end wall sections and arranged in spaced elevated relationship, said tabs being turned inwardly from the end wall sections, the ends of said tabs being overlapped to provide a series of continuous vertical step up wall portions arranged at different elevations, and a strip section having a portion thereof draped over said vertical step up wall portions providing a series of article-supporting tiers arranged at different elevations.

3. A shipping and display carton comprising a body formed of paper board material, including end wall sections, a rear wall section connecting said end wall sections, a series of tabs extending from said end wall sections and arranged in spaced elevated relationship, said tabs extending inwardly from the end wall sections in overlapping relationship to provide a series of vertical step up wall portions extending across the front of the carton at different elevations, and a strip section having a portion thereof draped over said vertical step up wall portions providing a series of article-supporting tiers arranged at different elevations.

4. A shipping and display carton comprising a body formed of paper board material including, end wall sections, a rear wall section connecting said end wall sections, a series of tabs extending from said end wall sections and arranged in spaced elevated relationship, said tabs extending inwardly from the end wall sections, the ends of said tabs overlapping and being secured together to provide a series of continuous vertical step up wall portions arranged at different elevations, and a strip section having a portion thereof draped over said vertical step up wall portions providing a series of article-supporting tiers arranged at different elevations.

5. A shipping and display carton comprising a body formed of paper board material including, end wall sections, a rear wall section connecting said end wall sections, a series of tabs extending from said end wall sections and arranged in spaced elevated relationship, said tabs extending inwardly from the end wall sections, the ends of said tabs overlapping and being interlocked to provide a series of continuous vertical step up wall portions arranged at different elevations, and a strip section having a portion thereof draped over said vertical step up wall portions providing a series of article-supporting tiers arranged at different elevations.

6. A shipping and display carton comprising a body formed of paper board material including end wall sections, a rear wall section connecting said end wall sections, a relatively low front wall section, a series of tabs extending from said end wall sections and arranged in spaced elevated relationship, said tabs extending inwardly from the end wall sections in overlapping relationship to provide a series of vertical step up wall portions extending across the front of the carton at different elevations, and a strip section fixedly held at a point adjacent to the inwardly turned tabs forming the lowest front wall section, said strip section having portions thereof draped over said vertical step up wall portions to provide a series of merchandise containing pockets arranged in tier formation.

7. A shipping and display carton comprising a body formed of paper board material including end wall sections, a rear wall section connecting said end wall sections, a relatively low front wall section, a series of tabs extending from said end wall sections and arranged in spaced elevated relationship, said tabs extending inwardly from the end wall sections, the ends of said tabs overlapping and being secured together to provide a series of continuous vertical step up wall portions at different elevations, and a strip section fixedly held at a point adjacent to the inwardly turned tabs forming the lowest front wall section, said strip section having portions thereof draped over said vertical step up wall portions to provide a series of merchandise containing pockets arranged in tier formation.

8. A shipping and display carton comprising a body formed of paper board material including end wall sections, a rear wall section connecting said end wall sections, a relatively low front wall section, a series of tabs extending from said end wall sections and arranged in spaced elevated relationship, said tabs extending inwardly from the end wall sections, the ends of said tabs overlapping and being interlocked to provide a series of continuous vertical step up wall portions arranged at different elevations, a strip section held in fixed position adjacent the inwardly turned tabs forming the lowest front wall section, said strip section having portions thereof draped over said vertical step up wall portions to provide a series of merchandise containing pockets arranged in tier formation, and means for attaching the strip section to the rear wall section of the carton whereby said strip is supported in tier arrangement.

9. A display carton comprising a body formed of paper board material including, end wall sections, a rear wall section connecting said end wall sections, a series of tabs extending from said end wall sections and arranged in spaced elevated relationship, said tabs extending inwardly from said end wall sections in overlapping relationship and secured together to provide a series of vertical step up wall portions extending across the front of the carton at different elevations, a strip section draped over said step up portions providing article-supporting pockets arranged in tier formation, means to releasably attach the strip section to the rear wall of the carton whereby said strip is supported in tier arrangement, said strip section being movable upon disconnection from the rear wall section to bring the bottoms of each of said pockets into substantially the same horizontal plane.

10. A display carton comprising a body formed of paper board material including, end wall sections, a rear wall section connecting said end wall sections, a series of tabs extending from said end wall sections and arranged in spaced elevated relationship, said tabs extending inwardly from said end wall sections in overlapping relationship and secured together to provide a series of vertical step up wall portions extending across the front of the carton at different elevations, a strip section draped over said step up portions providing article-supporting pockets arranged in tier formation, one end of said strip section being secured at a point adjacent the inwardly turned tabs forming the lowest front wall, the other end of said strip section being provided with an extension member in the form of a display card, means to releasably attach the strip section to the rear wall section of the carton whereby said strip section is supported in tier arrangement, said strip section being movable upon disconnection from the rear wall section to bring the bottoms of each of said pockets into substantially the same horizontal plane, with the top edge of said display card at substantially the same level as the rear wall section of the carton.

WILLIAM A. RINGLER.